United States Patent Office 3,493,071
Patented Feb. 3, 1970

3,493,071
AIR CUSHION SUPPORTED PLATFORMS
Arthur Norman Street and Bruce Thomas Noble, Yeovil, England, assignors to British Hovercraft Corporation Limited, Yeovil, Somerset, England
Filed Apr. 4, 1968, Ser. No. 718,788
Claims priority, application Great Britain, Apr. 28, 1967, 19,824/67
Int. Cl. B60v 1/00
U.S. Cl. 180—124                              6 Claims

ABSTRACT OF THE DISCLOSURE

An air cushion supported load pallet has a load bearing platform provided with bearing feet or castors and a plurality of flexible diaphragms for containing cushions of pressurized air. Secured to each diaphragm is a reversible support means in the shape of an obtuse angled cone which when the platform is supported on air cushions is substantially the same shape as the lowermost surface of the diaphragm. When the air supply is shut off the platform sinks onto the bearing feet or castors causing the cone to be deflected upwardly due to contact with the ground to assume an inverted cone configuration and support the diaphragm clear of the ground.

---

Figure 1:
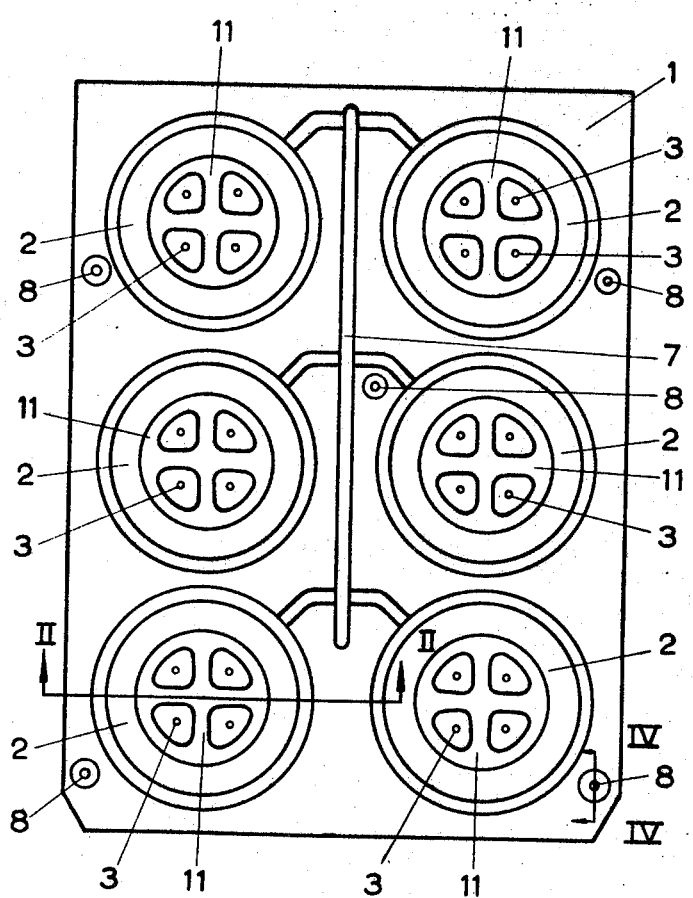

This invention relates to ground effect machines, and more particularly to load carrying pallets being supported on one or more independent air cushion pads.

Industrial load carrying pallets have long been in use which use wheels or castors for support. More recently, the use of air cushion pads for the support of such load pallets has been proposed. An air cushion supported pallet usually consists of a load bearing platform, below which are one or more flexible diaphragms. The inflation of the space between each diaphragm and the platform with pressurised air gives lift to the platform, and causes the diaphragm to assume a shape to act as boundaries to the air cushion pads which support the platform. Additionally, the platform may be provided with a flexible skirt which usually depends from the periphery of the platform. The term "air cushion suported" is meant to include other gases and fluids.

When air cushion supported load pallet diaphragms are not inflated, they hang loosely beneath the load bearing platform and, as the clearance between the platform is less when the pallet is resting on its feet than when it is air cushion supported, the diaphragms rub on the ground, wear, crease, and make movement of the pallet difficult. Further, when first pressurised for a lifting operation, a creased diaphragm may allow air to escape from the air cushion pad, making initial air cushion support difficult.

It is an object of the invention to provide a load carrying pallet in which creasing of the diaphragms when they are not inflated and the drag produced by uninflated diaphragms rubbing on the ground is considerably reduced.

According to the invention we provide a load carrying pallet, including a load bearing platform supported, in the operating condition, by at least one air cushion pad each pad being bounded in part by a diaphragm of flexible impermeable material attached, adjacent or in its central and peripheral regions, to the underside of the load bearing platform, a supply of air at superatmospheric pressure to inflate the spaces between each diaphragm and the underside of the platform, and reversible support means to cause said diaphragms to assume a position adjacent to the underside of the platform when the supply of superatmospheric air ceases.

Each reversible support means may consist of an obtuse angled cone having the same shape as the underside of the diaphragm, and the diaphragm and the cone may both have the same central securing point.

If desired, the cone may have elastic properties to provide the reversing characteristic.

The cone may have a configuration similar to a wheel lying on its side, having a hub which provides a fixing point for the cone, radial spokes and a rim. Either the spokes or the rim or both may have elastic properties.

Ground contacting members may be provided on the reversible support to ensure that reversal takes place.

In another feature of the invention we provide a ground effect machine having a rigid platform supported by at least one air cushion, the air cushion or cushions being bounded in part by barriers of flexible impermeable material, a supply of air at superatmospheric pressure to urge the barriers of flexible impermeable material to take up an operating shape and position, and reversible support means to cause the barriers of flexible impermseable material to assume a position adjacent to the underside of the platform when the supply of superatmospheric air ceases.

Figure 2:
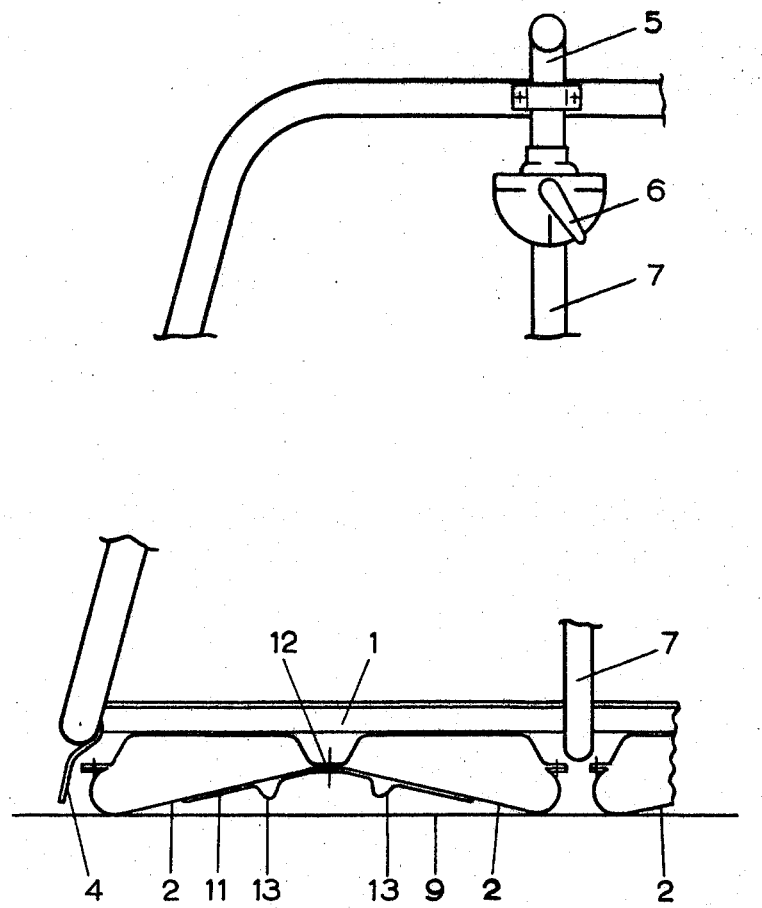
Figure 3:
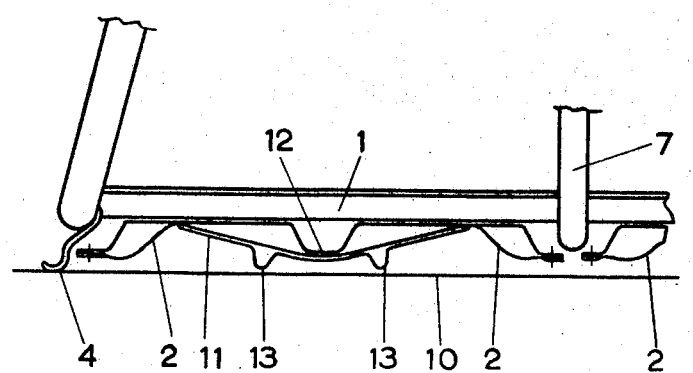

The invention will now be described, by way of example, with reference to the accompanying drawings, in which:

FIGURE 1 is an inverted plan view of a load carrying pallet according to the invention. For simplicity, the peripheral skirt has been omitted from this figure, FIGURE 2 is a section on the line II—II of FIGURE 1, on a larger scale with the top part of the guiding handle separated by broken lines from the lower part, showing a diaphragm and a diaphgram retraction cone in the positions they occupy when a load carrying pallet is air cushion supported, FIGURE 3 is a section similar to FIGURE 2, showing a diaphragm and a diaphragm retraction cone in the positions they occupy when a load carrying pallet is castor supported.

Figure 4:
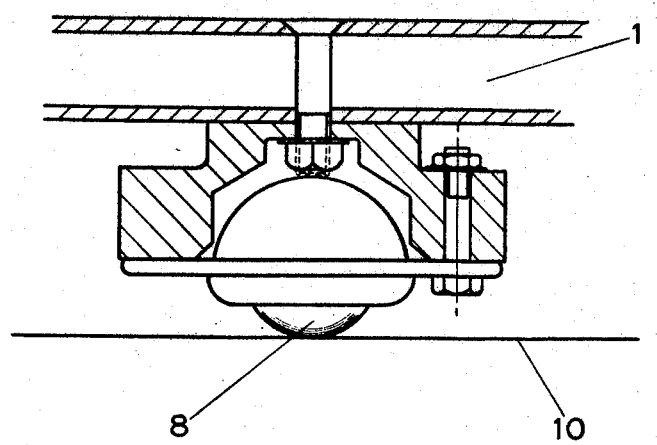

It should be noted that, as the supporting castors are positioned other than on the section line II—II, a castor is not shown in this figure, and FIGURE 4 is a section on the line IV—IV of FIGURE 1, on a larger scale, illustrating a ball castor.

A platform 1 is supported by air cushion pads having diaphragms 2 with orifices 3. The diaphragm 2 is constructed of any suitable flexible impermeable material, and may be moulded to the required shape. The orifices 3 are punched in the diaphragm 2. The platform 1 has a peripheral flexible skirt 4. The space between the diaphragms 2 and the underside of the platform 1 is inflated by pressurised air, and the pallet, in its air cushion supported operating condition, assumes the position, illustrated in FIGURE 2, relative to the ground line 9. When the pallet is not air cushion supported it sinks until it is resting upon its ball castors 8 in a position relative to the ground line 10 (FIGURES 3 and 4).

Pressurised air is fed to the pallet from any suitable external source via a flexible pipe to the pallet air inlet pipe 5. The air is controlled by a control cock 6, whence it passes to the independent air cushion pads through the supply pipe 7.

Positioned beneath the diaphragm 2, and adjacent to it, is an obtuse angled cone 11. The cone 11 is secured to the underside of the platform 1 at the position 12, which is also the central securing point for the diaphragm 2. The cone may be fabricated from thermoplastic material or any other material which provides the requisite properties of flexibility and elasticity. It is shaped to coincide with the underside of the diaphragm 2.

Portions of the obtuse angled cone 11 are cut away so that the cone has a configuration of a wheel with a hub, radial spokes and a rim. Formed on the spokes are ground contacting members 13.

During operation, when the pallet is air cushion supported, the cone 11 is positioned within the air cushion area of each pad adjacent to the underside of the diaphragm 2, and the lift provided by the air cushion is sufficient to provide a clearance between the ground contacting members 13 and the ground line 9.

When the lift air is shut off, the platform 1, together with the diaphragms 2 and the cones 11, sink, and the ground contacting members 13 force the cone to extend into a flat sheet. As the platform 1 continues to sink, the ground contacting members 13 force the cone 11 beyond the flat sheet configuration and, because of its elastic properties, it springs into an inverted cone position. In this position the inverted cone holds the diaphragm in a retracted position adjacent to the underside of the platform.

The diaphragm is extended by the lift air which, when turned on, inflates the diaphragm with sufficient force to cause the inverted cone to expand to a flat sheet, and then revert to an upright cone.

The elasticity of the cone may be provided by making the cone of elastic material, by providing an elastic rim, or by providing spokes capable of buckling to reduce their length and then spring back to their original length.

Although one embodiment is described herein and illustrated in the drawings, the invention is not to be considered as limited thereto, and modifications can be made which are within its scope. For example, a diaphragm having the properties necessary to give retraction may be provided, and a separate retraction cone dispensed with.

We claim as our invention:

1. A load carrying pallet, including a load bearing platform supported, in the operating condition, by at least one air cushion pad, each pad being bounded in part by a diaphragm of flexible impermeable material attached, adjacent or in its central and peripheral regions, to the underside of the load bearing platform, a supply of air at superatmospheric pressure to inflate the spaces between each diaphragm and the underside of the platform, and reversible support means comprising an obtuse angled cone having the same shape as the underside of the diaphragm when it is in the operating condition, said cone being made from material having suitable elastic properties which bias the cone to assume an inverted position so that it supports the diaphragm in a position adjacent to the underside of the platform when the supply of superatmospheric air ceases.

2. A load carrying pallet according to claim 1 including support means to support the pallet when it is not air cushion supported.

3. A load carrying pallet as claimed in claim 2, wherein the diaphragm and the cone have the same central securing point.

4. A load carrying pallet according to claim 2, wherein said support means comprise wheels or castors.

5. A load carrying pallet as claimed in claim 2, wherein the cone has a central hub which provides a fixing point for the cone, and a rim portion joined to the hub by means of radial spokes.

6. A load carrying pallet as claimed in claim 2 wherein ground contacting members are provided on the reversible support means to ensure that reversal takes place.

References Cited
UNITED STATES PATENTS

| | | | |
|---|---|---|---|
| 3,161,247 | 12/1964 | Mackie | 180—124 |
| 3,276,222 | 10/1966 | Hutchinson | 180—125 X |
| 3,318,406 | 5/1967 | Scheel | 180—124 X |

A. HARRY LEVY, Primary Examiner